March 16, 1943.                N. R. KELLY                2,314,092
           DEVICE FOR SIMULATING CERTAIN SOUND EFFECTS
                    Filed Aug. 31, 1939         2 Sheets-Sheet 1
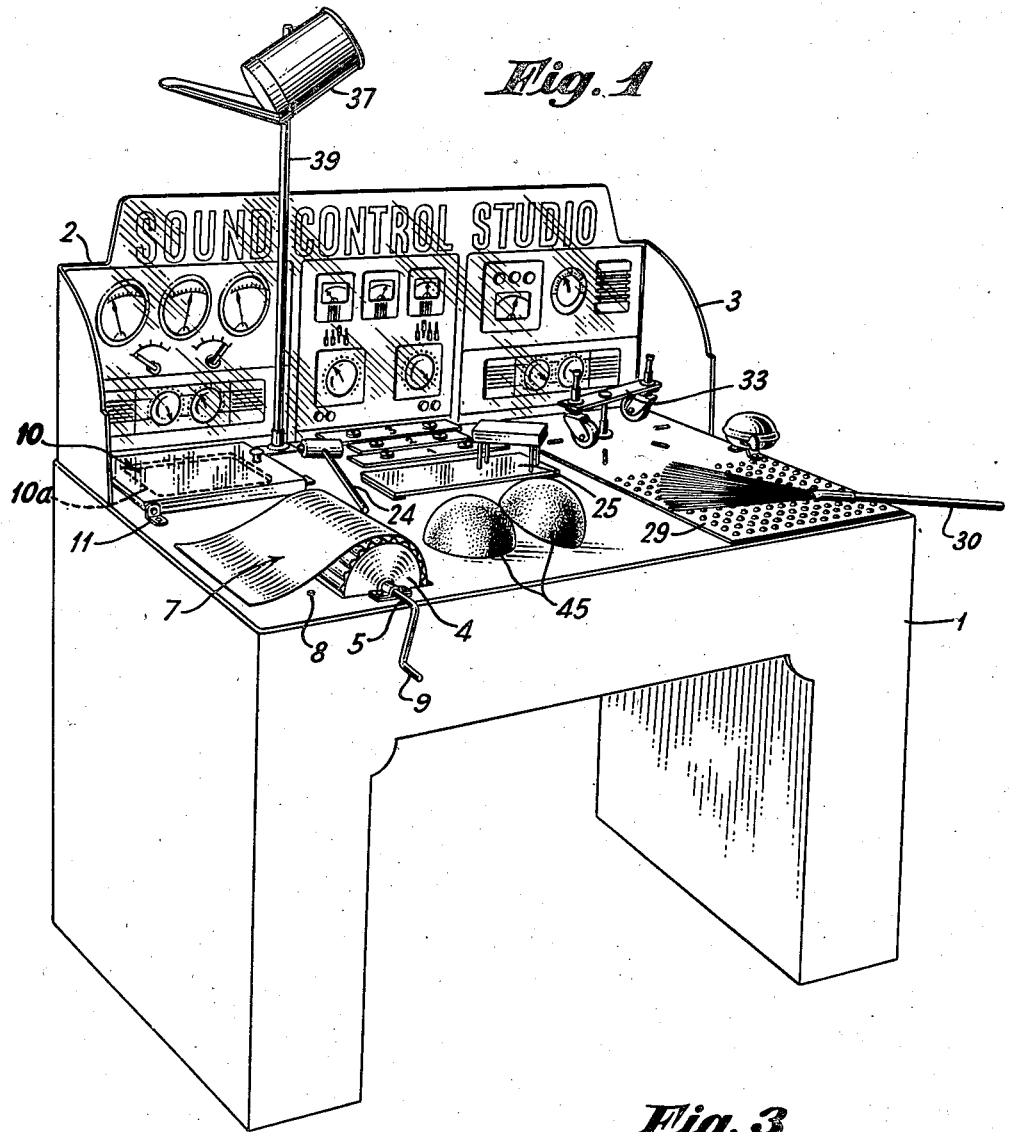
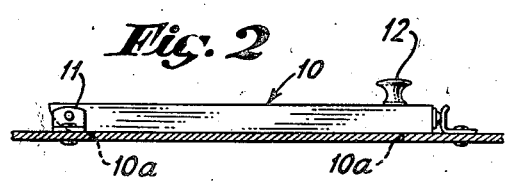
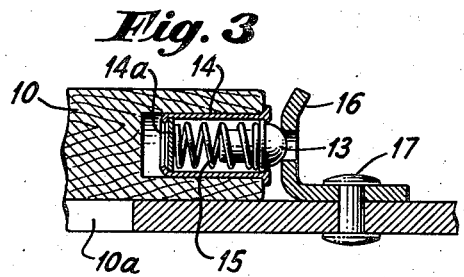
INVENTOR.
NORVAL RAY KELLY
BY
ATTORNEY.

March 16, 1943. N. R. KELLY 2,314,092
DEVICE FOR SIMULATING CERTAIN SOUND EFFECTS
Filed Aug. 31, 1939 2 Sheets-Sheet 2
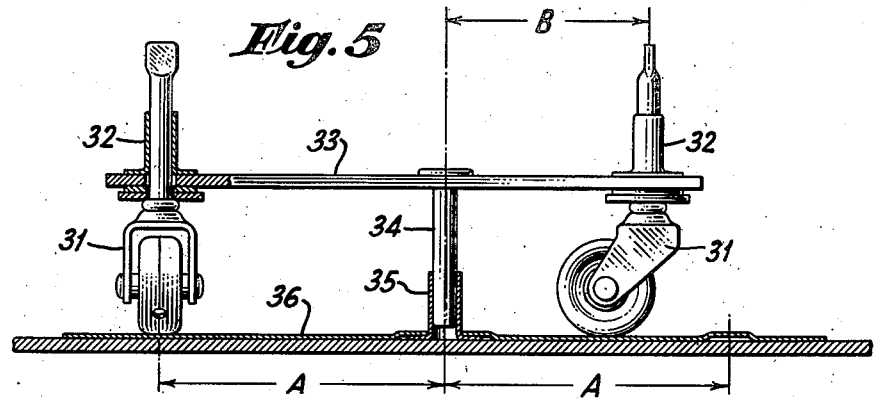
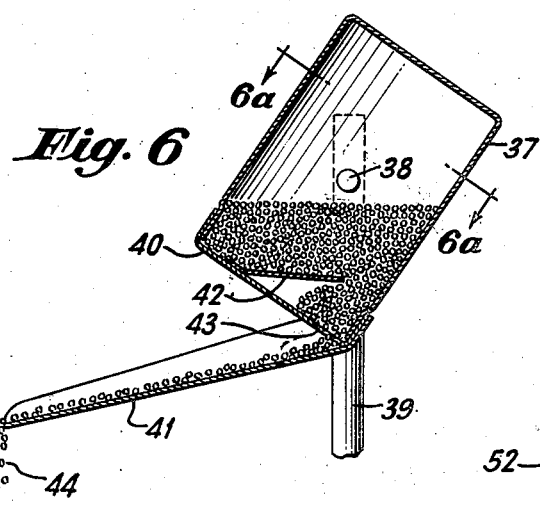
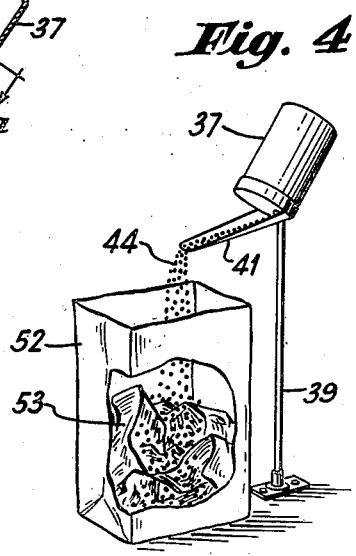
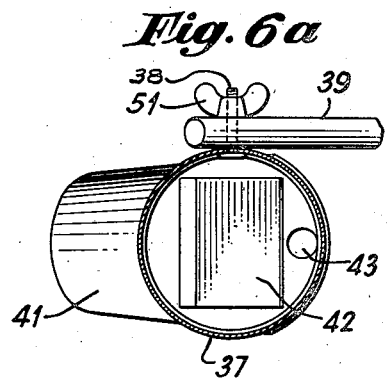
INVENTOR.
NORVAL RAY KELLY
ATTORNEY.

Patented Mar. 16, 1943

2,314,092

UNITED STATES PATENT OFFICE 2,314,092

DEVICE FOR SIMULATING CERTAIN SOUND EFFECTS

Norval Ray Kelly, Douglaston, Long Island, N. Y., assignor to Radio Corporation of America, a corporation of Delaware Application August 31, 1939, Serial No. 292,768

13 Claims. (Cl. 272—14)

This invention relates to apparatus for artificially producing different sound effects such as may be desired as background sounds for a radio broadcast program, or the like. More particularly my invention is directed to a combination of sound producing devices which may be selectively actuated for simulating certain familiar sound effects such as may occur in nature or under artificial conditions.

My invention is particularly useful as an amusement device and when constructed for this purpose it is contemplated that the various sound simulating units may be assembled in a kit and offered to the public as a toy which would have particular appeal to children in their teens. It is contemplated that my invention may be used in somewhat the same manner as are devices which have become more or less familiar in radio broadcast studio work, but that the devices of my invention are better adapted for use by children in putting on their own home "broadcast" program, or in giving home performances for their own amusement.

In carrying out my invention I have found it desirable to provide a console on which may be mounted a plurality of different sound simulating devices. In addition to the devices which are affixed to the console other devices are included in the kit, these being best adapted to be held in the hand and to be manipulated without other support. The complete assembly of sound producing devices as provided in the kit is, however, one which provides great flexibility in the selection of suitable background noises as an accompaniment for a performance such as might be termed an amateur broadcast program. It is contemplated that a group of children at play will use special scripts for such programs and will devise others to suit their fancy. Included in the kit is a book which contains a number of typical broadcast scripts specially written to bring out the possible uses of the various sound control devices. When a program is rehearsed, those who are to operate the sound control devices will practice their parts, so as to come in at the proper time with each appropriate sound effect.

Among the familiar sounds which it is possible to simulate when using my invention are the following:

The sound of more or less tempestuous wind; the sound of rain pattering on the roof; the sound of surf and breakers on the beach; the sound of thunder and explosions; the opening and closing, or slamming of a door with its accompanying squeaks; the sound of a railroad train whistle; the sound of engine exhaust and the clicking of railroad car wheels over the joints of the rails in the track; the sound of crackling fire; the sound of chimes from a broadcast studio; and the sound of horses' hoofs beating on the pavement.

The details of my invention will be best understood by reference to the following description when read in view of the accompanying drawings, in which:

Figure 1 shows in perspective a view of a preferred embodiment of my invention which includes a console having mounted thereon various and sundry sound simulating devices;

Fig. 2 shows in elevation a detail of one of the devices which is particularly adapted to simulate the sound of a door slam;

Fig. 3 shows in cross section a constructional detail of the door slam sound simulating device;

Fig. 4 shows in perspective a view of a preferred embodiment of my "rain-patter machine";

Fig. 5 shows an arrangement of apparatus for simulating the sound effect occasioned by the rolling of car wheels over rail joints;

Fig. 6 shows a cross sectional view of a sound producing unit which forms part of the assembly illustrated in Fig. 4, the arrangement being designed to simulate the patter of rain; and Fig. 6a shows a cross sectional view along the line 6a—6a of Fig. 6.

Referring first to Fig. 1, wherein is shown an assembly view of my so-called "Sound Control Studio," the console itself is designated 1. This console is preferably built somewhat like a desk and may be of any suitable material, either wood, metal or even stiff corrugated paper such as is used in the construction of cartons. The table top of the console has mounted thereon a number of devices for producing different sound effects. At the back of the console is a back board 2 having wings 3. This back board, in order to serve more effectively as an amusement device, has imprinted thereon various pictures, insignia, and other indicia. These imprints are intended merely for the purpose of putting a child in the proper frame of mind for enjoying the use of his amusement device.

A so-called "wind machine" is constituted by a cylindrical member 4. This cylindrical member is preferably composed of two end discs mounted upon a crank shaft 5 and having a corrugated sheet 6 wrapped around the peripheries. A strip of fabric 7 is wrapped around the cylinder and is secured by riveting at 8 to the underside of the table top of the console 1. In operation the loose end 8 of the sheet 7 is held in the left hand while the crank 9 is turned with the right hand. More or less tension applied to the overlying sheet 7 produces the simulation of a more or less tempestuous wind when the crank is turned. Also variations in the sound effects may be obtained by cranking the cylinder at fast or slow speeds.

My preferred embodiment of apparatus for simulating the sound of door slams is shown in Fig. 2 as consisting of a panel 10 hingedly mounted at one edge by means of hinges 11 which are attached to the table top. Near the other edge of the panel is a knob 12 by which the device may be lifted and either dropped or brought back to the closing position more or less gently. The sound of a door latch is imitated by means of a latch member, a cross sectional view of which is shown in Fig. 3. This portion of the apparatus consists of a stud 13 having a rounded head which protrudes through an opening in a cylindrical socket 14. The socket is mortised into the door panel. Both ends of the socket member 14 are spun over inwardly after assembly of its associated elements therein so as to hold the stud in place against the compression of a spring 15. The diameter of the orifice through which the rounded head of the stud protrudes is smaller than the diameter of a shoulder under the head of the stud 13. In order to provide for assembling the stud and socket combination the inner end of the socket member 14 is fitted with a disc 14a, this disc being held in place by the flange produced in the spinning operation aforementioned. With the construction as shown it will be seen that the stud 13 is normally urged outwardly against a latch bracket 16. This bracket is preferably riveted at 17 to the table top. The table top itself has an opening 10a beneath the panel 10, thereby to make the sound of the door slam more realistic. The manner of manipulation of the door slam device may be readily understood by reference to the illustrations given.

On the right hand side of the console and mounted towards the front of the table top is a device for simulating the sound of escaping steam, such as the exhaust of a locomotive. This device consists of a sheet of metal or other material formed with a large number of evenly spaced nubbles or smoothly rounded protuberances. The sheet 29 is permanently riveted to the table top. Resting upon the sheet 29 and available for manipulation at will is a wire brush 30. In operation the brush is held with the handle inclined at a very slight angle from horizontal and the surface of the sheet 29 is brushed rhythmically at a rate corresponding with the operation of the exhaust valves of a locomotive. A wrist action is preferably employed and the sound of a locomotive starting up from a standstill and gradually accelerating its speed may be very effectively imitated after a little practice.

A sound effect which is preferably combined with that of the engine exhaust is that of car wheels rolling over rail joints. This sound has a peculiar rhythm which varies in dependence upon the number of wheels in a car truck. Since most passenger cars are, however, equipped with trucks having two pairs of wheels, I have designed my railroad rail click device preferably to give two clicks and then a pause, then two more clicks. This is accomplished by means of the apparatus shown in Fig. 5. It consists of a pair of furniture casters 31, swiveled in bushings 32, which bushings are mounted on a bar 33. The bar 33 swings on a vertical axle 34 which is pivoted in a bushing 35, this bushing being preferably riveted to a supporting plate 36, and the plate 36 is screwed to the table top. One of the bushings 32 for the caster which produces the desired sound effects is positioned on the rod 33 at a radial distance A from the center of the pivot shaft 34. The other bushing 32 is similarly mounted on the bar 33 but at a radial distance B from the pivot shaft 34, this distance B being made sufficiently less than the distance A so that the corresponding caster will ride over a smooth portion of the plate 36. The outer caster 31 rides over a certain number of bumps disposed radially on the plate 36. These bumps are preferably unevenly spaced over an arc of 180° so that the rhythm of the rail click sounds shall be in accordance with the familiar sounds of an actual railroad car. The sound-producing caster 31 is held in the fingers and urged rotatively over the bumps in the plate 36 at different rotational speeds, depending upon the imagined speed of the train. Thus, in simulating the sound of a train starting up from a standstill, the device should be first rotated at very slow speed and the speed will be gradually accelerated until the sound of the train disappears as if in a distance. It will be apparent that it is desirable at times to operate both the rail click device and the engine exhaust device simultaneously in order to produce the familiarly associated sounds of a train. This can be accomplished by manipulating the brush 30 with one hand while manipulating the casters with the other hand.

In order to simulate the sound of rain pattering on the roof or on the pavement, I have provided a receptacle 37 as shown more in detail in Fig. 6, this receptacle being a container for seeds or other small hard objects selected from any of the materials including shot, sand and beads which can be poured into a paper bag. The receptacle 37 is provided with a horizontal pivot support 38 which is held in an elevated position by a post 39 (Fig. 1). The receptacle 37 is provided with a cap 40 of special construction. This cap has affixed thereto a pouring lip 41 and on the inside of the cap is also affixed a baffle wall 42. The cap has an opening 43 of suitable diameter to permit the seeds to be poured out slowly and to drop off the end of the lip 41.

When the receptacle 37 is tipped at certain angles to pour the seeds, it is apparent that only a small portion thereof can issue at any one time, the remainder being retained by the baffle wall 42.

The seeds are preferably poured into an open paper bag which contains a crumpled piece of Cellophane. The reverberatory effects of the seeds falling on the Cellophane are considerably intensified compared with the sound of dropping the seeds onto other surfaces.

Referring to Fig. 6a, I show more in detail how the receptacle 37 may be mounted on the post 39 so that it can be readily manipulated. The construction includes a bolt 38 the head of which is inside the cylindrical wall of the receptacle 37. The bolt goes through a hole in the post 39. The receptacle 37 can be clamped more or less tightly against the post by means of a wing-nut 51. Preferably the clamping will not be too tight since it is desired that the receptacle be tilted easily for pouring the seeds. Enough friction should be applied, however, between the receptacle and the post so that when not in use the receptacle will not rotate into the pouring position.

Fig. 4 shows more or less diagrammatically the cooperation of the rain pouring receptacle 37 and the paper bag 52 which contains crumpled Cellophane 53. The seeds 44 are shown dropping off the end of the pouring lip 41 and falling onto the surface of the crumpled Cellophane 53 within the bag 52.

Among the manipulatable devices which are preferably provided in my sound control kit is an arrangement for simulating the sound of horses' hoofs. This arrangement preferably consists of two halves 45 of a rubber ball as shown in Fig. 1. The manner of operation of this device is preferably to clap the balls against the chest of the operator in a certain rhythm which creates the rhythmic beat of horses' hoofs. The sound effects can be varied in amplitude either to indicate the horses' approach to or departure from an assumed scene of action.

It is found that the sound effect accompanying fire may be very surprisingly imitated by slowly twisting and crumpling a piece of Cellophane. A sheet of Cellophane has, therefore, been provided in the kit, although it is not illustrated in the accompanying drawings, except in combination with the device for simulating the sound of rain. See Fig. 4. When the Cellophane is crumpled in the hand it sounds like crackling fire, or it may be used to imitate the sound of frying an egg.

Numerous other detached devices for producing different sound effects are preferably included in my sound control studio kit. These devices, however, are to a certain extent well known in the art and do not constitute in themselves any contribution to my invention, except as they may be used in various combinations for producing composite sound effects.

The kit contains full instructions for enabling a child to operate each of the sound control units so as to obtain the fullest enjoyment thereof.

My invention is capable of modification in various ways, as will be manifest to those skilled in the art. The invention is, therefore, limited only in accordance with the claims.

I claim:

1. Apparatus for supplying sound effects as an appropriate back-ground for a word recitation or drama, comprising a console, a back board mounted to stand above the table top level of said console and bearing pictures of instruments and control knobs appropriate to a control desk of the type commonly used in broadcast studio control rooms, a plurality of noise producing devices mounted in a predetermined arrangement on said console, said arrangement being suitable for selective and dexterous manipulation of said devices, means for differently characterizing the noise issuing from each said device, said means being such that train rumble, rain patter, stormy winds, and other sound effects may be simulated, and means providing freedom of choice in the manipulation of said devices, either singly or in concert, whereby the familiar association of different sound effects with a given experience may be reproduced.

2. Apparatus according to claim 1, wherein said noise characterizing means comprises a pivoted container having a quantity of small homogeneous objects therein, a pouring lip attached beneath an orifice in said container, and a paper bag into which said objects may be poured when said container is sufficiently tilted on its axis, thereby to simulate the sound of rain patter, said bag having means therein for intensifying the sound of the impact of said objects when falling into the bag.

3. Apparatus for simulating certain sounds which familiarly accompany a moving railroad train, comprising a platform having a rotary runway, a plurality of ridges formed at regularly spaced circumferential points along a 180° arc of said runway, and a wheel-supported member adapted to roll successively and rhythmically over said ridges and to describe a plurality of 360° excursions along said runway in response to manipulation.

4. Apparatus for simulating certain sounds which familiarly accompany a moving railroad train, comprising a platform having thereon a plurality of evenly spaced protuberances, and means including a manipulatable wire brush for sweeping said platform, thereby to simulate the sound of exhaust steam.

5. Apparatus for simulating the sound of rain-patter, comprising a container mounted to swing on a horizontal axis, a quantity of small homogeneous objects selected from the group comprising sand, seed, shot, beads and minute loose particles of hard material, said objects being enclosed in said container, an orificed container cover, a pouring lip on said cover, a baffle wall affixed to the inside of said cover, and means including an open paper bag and a piece of crumbled Cellophane within said bag, the bag being supported in position to receive the particles poured from the lip of said container, the last said means being adapted to amplify the sound of successive impacts of the particles poured from said container.

6. Apparatus for amusement and for simulating natural sound effects, comprising a table top, an assembly of noise producing devices mounted on said table top, said devices including those which are capable of simulating the sounds of moving train rumble, stormy wind, rain patter, and the like, means for manipulating each of said devices selectively at will, thereby to produce a succession of different and variously combined sounds, all appropriate to an auditory studio program, and means enhancing the appearance of said apparatus as a toy, said means including an ornamented back board supported above said table top.

7. Apparatus for simulating certain sounds accompanying a moving train, comprising a table having thereon a rotary track, a series of evenly spaced radial ridges on an arc of 180 degrees of said track, a spindle mounted at the center of curvature of said track, an arm swiveled on said spindle, a caster mounted on one end of said arm and adapted to roll along said track and to bump over said ridges, and another caster mounted on the other end of said arm and adapted to roll over a smooth portion of said table.

8. Apparatus for simulating certain familiar sounds, comprising a table having thereon a sheet-metal plate, a plurality of evenly spaced smoothly rounded protuberances formed on the top surface of said plate, and means including a manipulatable wire brush for rhythmically sweeping said plate, thereby to produce a sound simulative of the sound of exhaust steam from a locomotive or the like.

9. Apparatus for simulating certain familiar sounds, comprising a table, a vertical post mounted in a socket in said table, a horizontal spindle attached at one end to the upper part of said post, a closed receptacle attached to said spindle, a pouring lip at one end of said receptacle, means providing communication between the pouring lip and the interior of said receptacle, a quantity of small hard objects selected from the group comprising seed, shot, sand, beads and the like, said quantity being contained in said receptacle, a flat bottomed paper bag supported by said table and having its open end positioned to receive a flow of said objects when dropped from said pouring lip, and means including a crumpled piece of Cellophane in the bag for receiving the impact of said objects.

10. In combination, a kit of different devices each device being adapted for manipulation to artificially reproduce a familiar sound, different devices being adapted to simulate the respective sounds of train rumble, rain patter, tempestuous winds, and other sound effects, and means for supporting said devices for selective manipulation in different simultaneously operative groups and sequentially, said means comprising a corrugated paper console having a back board with indicia thereon simulative of a panel having electrical instruments and control members.

11. As an article of manufacture, a toy constituted by a kit of noise producing devices adapted to be manipulated selectively and at times simultaneously for producing the effects of familiar sounds and appropriate sound accompaniments of events such as those enacted in a radio broadcast studio, said devices including those which are capable of simulating the sounds of moving train rumble, stormy wind, rain patter, and the like, a desk console arranged to support said devices conveniently for coordinated manipulation, at times sequentially and at times concertedly, and means to enhance the appearance of said toy, said means comprising a back board mounted above the table level of said console and bearing imprints representing electrical apparatus such as commonly utilized in the control room of said broadcast studio.

12. A manipulatable device for simulating the sound of railroad car wheels bumping over railway joints, said device having a pivotally mounted member supported by casters, and a substantially flat platform having ridges over which its casters may ride.

13. A device for simulating the familiar sound of exhaust steam as it issues from a running locomotive, said device comprising a substantially flat platform having thereon a multitude of evenly spaced protuberances, and a wire brush adapted for manipulation by sweeping the same rhythmically over said platform.

NORVAL RAY KELLY.